May 15, 1956  E. N. JACOBI  2,745,275
MEANS FOR SECURING AN INSTRUMENT TO AN INSTRUMENT PANEL
Filed Oct. 7, 1954  2 Sheets-Sheet 1
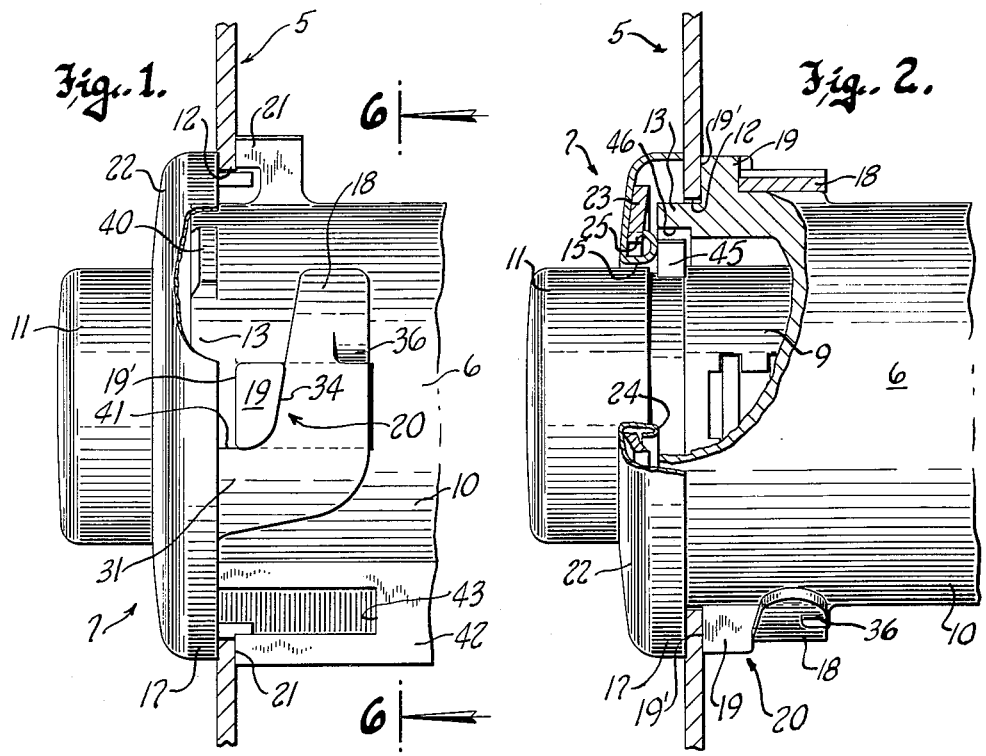
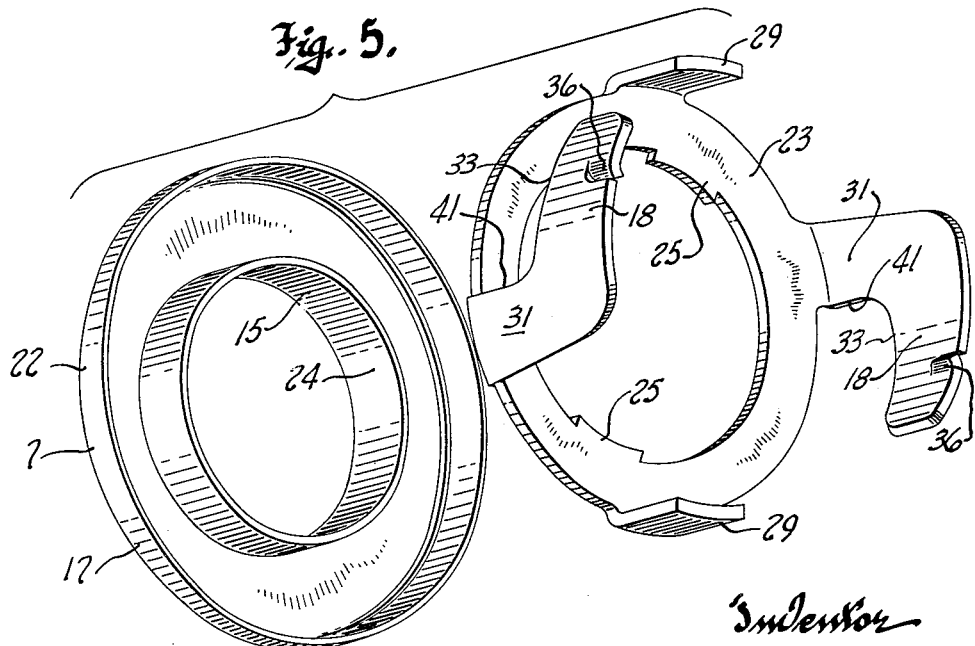
Inventor
Edward N. Jacobi
By Ira Milton Jones
Attorney

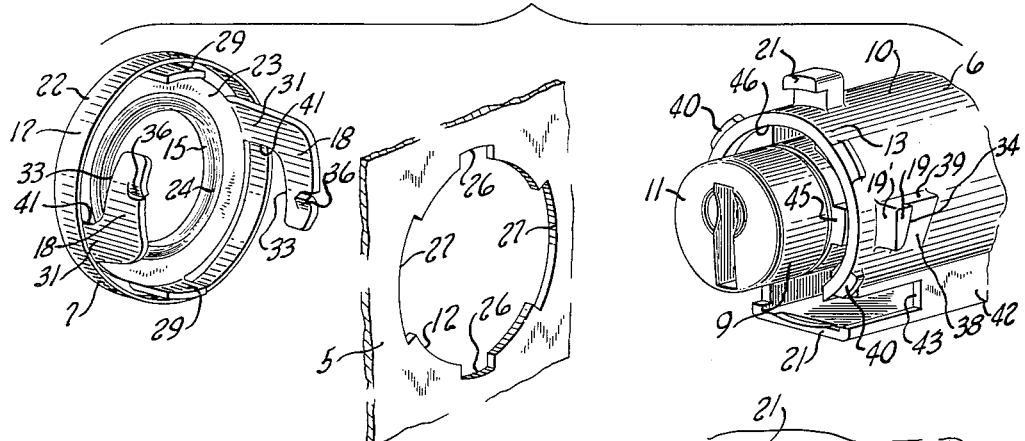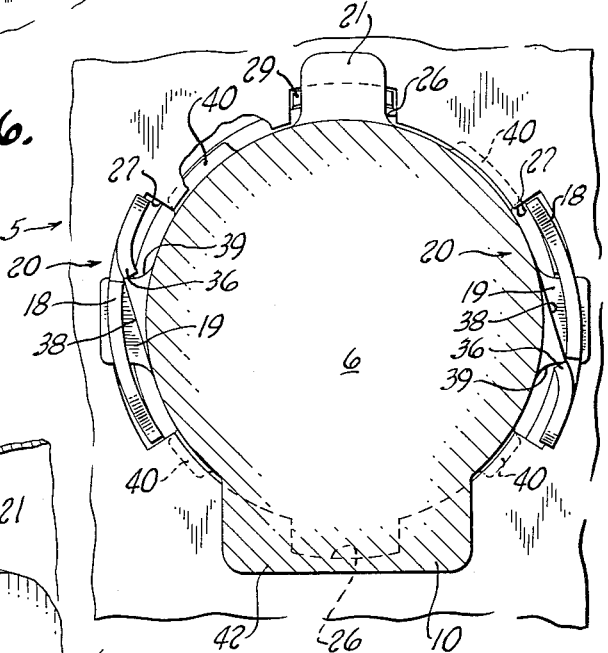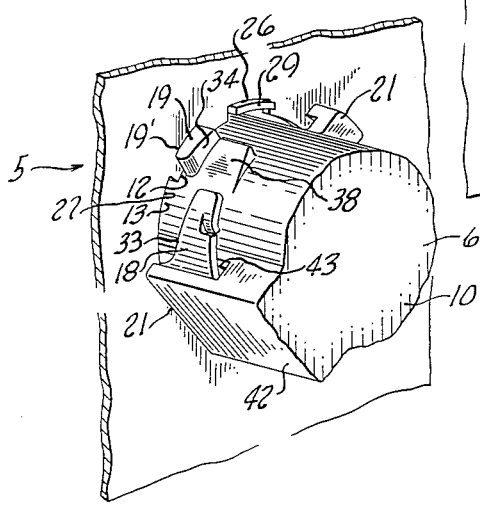

United States Patent Office

2,745,275
Patented May 15, 1956

2,745,275

MEANS FOR SECURING AN INSTRUMENT TO AN INSTRUMENT PANEL

Edward N. Jacobi, Milwaukee, Wis., assignor to Briggs & Stratton Corporation, Milwaukee, Wis., a corporation of Delaware Application October 7, 1954, Serial No. 460,806

13 Claims. (Cl. 70—370)

This invention concerns the securement of instruments to instrument panels or the like, and has more particular reference to improvements in means by which an instrument may be fastened to a panel without the use of screws or tools of any kind.

In general it is the purpose of this invention to provide for securement of an instrument to the rear of a panel by means of a bezel member applied to the front of the panel with its aperture in register with a hole in the panel through which the instrument is accessible. According to this invention a mounting member on the instrument is firmly secured to the back of the instrument panel by the bezel member, without the use of tools of any kind, through the interengagement of means on the bezel member and the instrument mounting member which cooperate to provide a bayonet connection between said members causing the same to tightly clamp a portion of the panel between them and to be thus securely held in position on the panel.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

Figure 1 is a view partly in side elevation and partly in section showing an instrument mounted upon the back of an instrument panel by means of this invention;

Figure 2 is a plan view thereof, portions being shown cut away;

Figure 3 is a group perspective view showing the instrument and the bezel member separated from the panel;

Figure 4 is a fragmentary perspective view looking at the back of the instrument panel and showing the instrument in a state of partial assembly thereto;

Figure 5 is a group perspective view showing the component parts of the bezel member separated from one another; and Figure 6 is a cross sectional view taken through Figure 1 along the plane of the line 6—6.

Referring now to the accompanying drawings, the numeral 5 designates a substantially flat upright panel of sheet metal or the like, having an instrument 6 mounted on its back by means of a bezel member 7 engaged over a portion of the panel at the front thereof.

The instrument here shown for purposes of illustration is a push button type cylinder lock such as is generally provided for the glove compartment of an automobile; and the section of panel 5 having the lock mounted thereon may be either the door of the glove compartment or a portion of the instrument panel directly adjacent to the door opening.

As is customary, the lock comprises a cylinder 9 rotatably mounted in a casing 10, which casing, for the sake of convenience, can be termed the mounting member of the instrument. The front of the lock cylinder projects forwardly from its casing and provides a push button 11 by which the cylinder is depressible into its casing to effect disengagement of a latch bolt from a keeper (not shown) thereby to allow the compartment door to be opened.

The panel has an access hole 12 therein to loosely receive the front end portion 13 of the lock casing or mounting member 10, and through which the latter projects. The bezel member, of course, covers the edge of the access opening 12 in the panel and the front of the lock casing, to generally improve the appearance of the installation, and it has an aperture 15 through which the push button projects and a rearwardly extending cylindrical skirt 17 on its periphery which abuts the front of the panel. According to this invention, the bezel member 7 serves to prevent rotation of the instrument in the access hole in the panel and also precludes rearward axial displacement of the instrument off of the panel by reason of the engagement of a pair of hook-like spring fingers 18 on the bezel member with lugs 19 on the lock casing to provide a bayonet connection, designated generally by 20, between the lock casing and bezel member, as more particularly described hereinafter.

The engagement of the front end portion 13 of the lock casing 10 in the access hole 12 serves to locate the instrument on the panel; and the extent to which the front portion 13 of the casing projects forwardly through the access hole is determined by the engagement of abutments 19' on the front of the lugs 19 with the rear face of the panel. To assure stable mounting of the instrument additional abutments 21 may be provided on the lock casing, circumferentially spaced from the lugs 19 and having their front panel-engaging faces coplanar with those on the lugs 19.

The bezel member is of two-piece construction, comprising an outer shell 22 of bright metal and a flat ring-like inner member 23 of spring material having the spring fingers 18 formed as a part thereof. The inner member 23, which may be readily fabricated as a stamping, fits inside the cylindrical skirt 17 of the shell 22, and an inner cylindrical flange 24 on the shell, which forms the aperture 15 in the bezel member, is spun radially outwardly and forwardly over diametrically opposite pads provided by radially inwardly projecting tangs 25 on the ring-like member 23, as best seen in Figure 2, to hold the latter connected to the shell 22.

As best seen in Figures 3 and 6, the panel is provided with upper and lower diametrically opposite notches 26 and substantially larger laterally opposite notches 27, all of which open to the access hole 12. Diametrically opposite tangs 29, projecting rearwardly from the periphery of the ring-like inner member 23 and received in the bottom portions of the upper and lower notches 26 in the panel, serve to hold the inner spring member 23 of the bezel member against rotation relative to the panel and locate the entire bezel member on the front of the panel, centered with respect to the access hole therein.

The hook-like spring fingers 18 are integral with and extend from the rear end portions of rearwardly projecting spring arms 31 on the inner ring-like portion of the bezel member. When the bezel member is installed on the panel, the spring arms 31 are accommodated in the laterally opposite notches 27 in the panel, it being understood that these notches have sufficiently greater arcuate length than the notches 26 to accommodate the hook-like fingers 18 as they are passed through the panel.

The two hook-like fingers extend circumferentially from their arms in the same direction around the exterior of the casing 10, namely in a clockwise direction as seen in Figures 4 and 6. The edges 33 of the spring fingers which face the rear of the panel diverge from the plane thereof toward the outer ends of the fingers and engage behind correspondingly angled surfaces 34 on the laterally opposite lugs 19 on the mounting member to afford the hereinbefore mentioned bayonet joint 20 between the bezel and mounting members. Although the surfaces 33 and 34, on the spring fingers and lugs 19 respectively, can beconsidered as being substantially parallel to the plane of the panel 5, the most secure mounting of the instrument on the panel is achieved when these surfaces are disposed at a slight acute angle to the panel in the manner just described, since a camming or wedging engagement is then effected between the lugs 19 and the forward edges 33 of the spring fingers. Such wedging forcibly draws the bezel and mounting members together to thereby cause a portion of the instrument panel to be tightly clamped between the bezel member and the abutments 19' and 21 on the exterior of the mounting member.

An important feature of the bezel member resides in the manner in which the inner ring-like member 23 is secured to the outer shell portion 22. The clinched joint between these members is effected at localized areas of the ring 23 by the engagement of the spun-over inner flange 24 of the outer shell 22 with the pads provided by the radially inwardly projecting tangs 25 on the inner spring ring. The pads or tangs 25 are located at points relatively remote from both spring arms 31 with the result that during final wedging of the lugs 19 along the bases of the spring fingers 18 substantial portions of the spring ring adjoining the base of the arms 31 are free to flex without interference from the flange 24 on the bezel, in a direction to permit the arms 31 to yield rearwardly toward the lugs 19, thus contributing to the resiliency of the bayonet joint without the provision of other spring means. The resultant forward bias imparted to the lock casing through the bayonet joint insures a firm, non-rattling engagement between the abutments 19' and 21 and the rear face of the panel.

It is another important feature of this invention that once the lugs 19 are wedged against the base portions of the fingers 18, as seen in Figure 1, the mounting member or lock casing is prevented from rotation in either direction to a position at which the bayonet connection between it and the bezel member is disabled. Counterclockwise relative rotation of the instrument is of course prevented by the engagement of the abutments 19 with the longitudinal edges 41 of the spring arms from which the spring fingers project when the bayonet connection is established. The prevention of clockwise rotation of the lock casing is achieved through the provision of a ratchet-like connection between each spring finger and its adjacent lug 19 comprising a barb 36 cut in the rear edge of the spring finger and directed radially inwardly toward the adjacent side of the mounting member. As the lock casing is rotated counterclockwise, each barb rides up a tapered surface 38 formed as a reduced rearward extension of the lug 19 and snaps over an abrupt shoulder 39 thereon at the same time that the abutments 19 are wedged firmly against the bases of the spring fingers 18. The abutments 39, of course, extend longitudinally along the exterior of the mounting memebr and their surfaces, which are engaged by the free edges of the barbs 36, are substantially normal to the plane of the panel 5.

Because rotation of the bezel member relative to the panel is prevented by the engagement of the tangs 29 on the spring ring in the notches 26 in the panel, the bezel member thus precludes any possibility of the instrument rotating on the panel.

It will be observed that the rearward force upon the spring fingers exerted by their wedging or camming action with the cooperating angularly disposed surfaces on the lugs 19 flexes the inner spring ring in such a manner that the free ends of the spring fingers are urged toward one another, into snug engagement with the sides of the lock casing, preventing rattling between these members and assuring security of the ratchet-like connection between the barbs 36 and the shoulders 39 with which they coact.

In assembling the lock mechanism to the panel 5 the bezel member 7 is first applied to the front of the panel with the tangs 29 thereon received in the bottom portions of the notches 26 opening to the edge of the access hole in the panel and with the arms 31 extending through the notches 27 and the spring fingers disposed at the rear of the panel.

The lock mechanism, namely the casing 10 with the lock cylinder 9 in place therein, is applied to the rear of the panel by moving the lock mechanism bodily forwardly while holding it in a position displaced substantially 45° in the clockwise direction from its installed position seen in Figure 6. To facilitate initial installation of the instrument in the panel, the mounting member may be provided at its front end with four radial lugs 40, each circumferentially displaced 45° from the lugs 19 and 21. The rear faces of the lugs 40 lie in a common plane and are engageable with the front face of the panel to preclude rearward displacement of the lock casing. When the instrument is held in its rotational position of insertion shown in Figure 4, the lugs 40 align with the notches 26 and 27 in the panel and readily pass therethrough. Counterclockwise rotation of the instrument to establish the bayonet connection 20 brings the lugs 40 into engagement with the unnotched edge portions of the access hole, where they cooperate with the lugs 19 and 21 to more or less loosely retain the mounting member of the instrument on the back of the panel.

In the inserting position of the instrument, shown in Figure 4, the lugs 19 on the sides of the mounting member clear the extremities of the spring fingers 18 to allow the lugs 40 to be passed through the notches in the panel and to enable the lugs 19 to engage the rear face of the panel.

Rotation of the instrument counterclockwise through 45° from its position shown in Figure 4 engages the bayonet connection and completes the installation, as the lugs 19 strike the edges 41 of the rearwardly projecting arms 31 from which the spring fingers project and the barbs 36 on the spring fingers snap off the inclined surfaces 38 of the reduced rearward extension of the lugs 19 and engage the abrupt shoulders 39 on these extensions to prevent retrograde rotation of the lock mechanisms relative to the panel.

In the particular lock mechanism shown, the casing or mounting member 10 is provided with a longitudinal rib 42 on its exterior, along the bottom thereof. The forward end of this rib provides one of the abutments 21 which engages the rear of the panel 5 when the lock mechanism is mounted on the panel. As seen best in Figure 3 this rib is of hollow construction and one of its side walls is cut away as at 43 to clear one of the spring fingers 18 on the bezel member as the front portion of the mounting member is inserted forwardly through the access hole in the panel during assembly of the mounting member thereto. The manner in which the spring finger 18 is received in the slot 43 is best shown in Figure 4, which shows the position of the mounting member on the panel after its lugs 40 have been passed forwardly through the notches in the access hole and before the mounting member has been rotated counterclockwise to establish the bayonet joint between the bezel and mounting members. Counterclockwise rotation of the mounting member to establish the bayonet connection carries the rib 42 away from the adjacent spring finger 18 and this finger may be said to emerge from its initial position inside the rib shown in Figure 4.

According to this invention it is also possible to employ the bezel member 7 to limit forward projection of the lock cylinder or push button 9 from the panel under the influence of its return spring, not shown, and at the same time to hold the lock cylinder 9 against forward displacement from the mounting member or casing 10. This may be effected by providing a shoulder 45 on the lock cylinder, projecting a short distance radially outwardly from its exterior (see Figure 2) and which is normally received in a counterbore 46 in the front end of the mounting member to permit rotation of the cylinder relative to the casing 10. The front surface of this shoulder 45 engages the inwardly curled flange 24 of the shell portion 22 of the bezel member, to define the forward limit of motion of the push button 11 and, as stated, to preclude forward displacement of the lock cylinder from the casing, without in anywise interfering with rotation of the cylinder between its locked and unlocked positions.

From the foregoing description taken with the accompanying drawings, it will be readily apparent to those skilled in the art that this invention provides an exeptionally simple yet secure means for attaching an instrument to an instrument panel, whereby such attachment may be accomplished entirely without the use of tools.

What I claim as my invention is:

1. Means for securing the mounting member of an instrument to a panel in line with an access hole in the panel, comprising: abutment means on the exterior of said member engageable with one face of the panel at a plurality of locations spaced around said access hole; a bezel member having an annular front portion engageable with the other face of the panel; cooperating means on the panel and on one of said members interengageable to hold the latter in a predetermined position on the panel relative to said access hole and against rotation relative to the panel; and other cooperating means on said members substantially providing a bayonet joint therebetween rendered effective by rotation of the other of said members in one direction relative to said nonrotatable member to hold said members against separation, with portions of the panel clamped between the bezel member and said abutment means to maintain the mounting member in position on the panel and to maintain the annular front portion of the bezel member in engagement with said other face of the panel, with its aperture in line with the access hole in the panel.

2. The securing means set forth in claim 1 wherein said other cooperating means comprises a lug on one of said members and an arm on the other of said members having a circumferentially extending hook-like finger on its outer end portion engageable with a surface on the lug which is disposed substantially parallel to the plane of the panel to hold said members clamped to the panel.

3. The securing means set forth in claim 2 further characterized by the provision of a barb on said finger engageable behind a surface on said lug which is substantially normal to the panel, to prevent relative rotation between said members in a direction to disable said bayonet joint therebetween.

4. Means for securing the mounting member of an instrument to a panel in line with an access hole in the panel, comprising: a plurality of lugs on the exterior of said member having coplanar forwardly facing surfaces engageable with the rear face of a panel at a plurality of locations spaced around an access hole in the panel, said lugs also having rearwardly facing surfaces substantially parallel to the plane of the forwardly facing surfaces thereon; a bezel member having an annular front portion engageable with the front face of a panel; means on the bezel member providing diametrically opposite tangs engageable in notches in the panel to hold the bezel member in a predetermined position on the panel secured against rotation relative to the panel and with the aperture in the annular front portion of the bezel member in line with the access hole; and means on the bezel member providing diametrically opposite arms projecting rearwardly through the access hole and having spring fingers thereon extending circumferentially in one direction from said arms and engageable behind said lugs on the mounting member to provide a bayonet joint between said members rendered effective by rotation of the mounting member in the opposite direction relative to the bezel member, which joint prevents separation of said members from the panel and holds them with a portion of the panel clamped between the bezel member and said lugs on the mounting member.

5. The securing means set forth in claim 4 further characterized by the fact that one of said spring fingers is provided with a barb struck therefrom, said barb being directed inwardly toward the mounting member and engageable with an abutment on the exterior of the mounting member to prevent rotation of the latter in a direction to disable the bayonet joint between said members.

6. The securing means set forth in claim 5 further characterized by the fact that said lugs on the exterior of the mounting member have rear portions of reduced height upon which said spring fingers rest, one of said reduced height portions having the abutment thereon with which said barb on the spring finger is engageable to preclude rotation of the mounting member in a direction to disable the bayonet joint between said members.

7. Means for securing the mounting member of an instrument to the rear of a panel in line with an access hole in the panel, comprising: a front portion on said member projecting forwardly through said access hole to locate said member on the panel; abutments on the exterior of said member engaged with the rear of the panel to limit the extent which said front portion of the mounting member projects through the access hole; circumferentially spaced lugs on the front portion of the mounting member, projecting radially outwardly therefrom, and engaging the front of the panel to prevent rearward detachment of said member from the panel except upon rotation of the mounting member to a position at which said lugs align with notches in the panel opening to said access hole; a bezel member engaging the front of the panel and having tangs thereon engaged in certain of said notches in the panel to locate the bezel member with respect to said access hole and to prevent rotation of the bezel member relative to the panel; and cooperating means on the mounting and bezel members providing a bayonet joint therebetween by which the bezel member is held against separation from the front of the panel and said members are drawn toward one another to effect clamping of a portion of the panel between the bezel member and said abutments on the mounting member, said bayonet joint being established as a consequence of rotation of the mounting member relative to the bezel member and the panel from said position thereof at which the mounting member may be detached from the panel.

8. Means for securing the mounting member of an instrument to a panel in line with an access hole in the panel, comprising: a bezel member having an annular front portion adapted to fit over the marginal edge portion of an access hole in a panel, at the front face of the panel, and having an arm extending rearwardly from said annular front portion, to project through the access hole, said arm terminating in a circumferentially extending finger having a front surface substantially parallel to the annular front portion of the bezel member, said finger having a radially inwardly projecting barb thereon; a lug on the mounting member of the instrument having a surface engageable with said front surface on the finger to provide a bayonet joint therewith engageable upon rotation of said member in one direction relative to the bezel member, said lug having an abrupt shoulder engageable by the barb upon establishment of the bayonet connection to prevent rotation of said member in the opposite direction; and means on the mounting member of the instrument defining a forwardly facing abutment engageable with the rear face of a panel upon establishment of the bayonet connection between said members to clamp the panel between said abutment and the front portion of the bezel member.

9. A bezel member for securing the mounting member of an instrument to the rear of a panel, in line with an access hole in the panel, said bezel member comprising: a spring member having an annular front portion with a pair of diametrically opposite integral tangs projecting radially inwardly therefrom, said spring member having a pair of integral arms extending rearwardly from its annular front portion, circumferentially spaced from said tangs, each of said arms terminating at its rear in an integral circumferentially projecting finger, both of said fingers projecting in the same direction and each having a surface facing and substantially parallel to the plane of the annular front portion of the spring member; and an annular outer shell covering the front face of the annular portion of said spring member and having flange portions engaged with said tangs on the spring member to prevent separation of the shell and the spring member while permitting the annular portion of the spring member to flex in such a manner that the arms thereon can move rearwardly.

10. The bezel member of claim 9, wherein each of said fingers has an integral radially inwardly bent barb cut therein.

11. The bezel member of claim 9 wherein said surface on each of said fingers is disposed at an acute angle to the plane of the annular front portion of the spring member, diverging from said plane toward the tips of the fingers.

12. As an article of manufacture, a retainer formed of resilient sheet stock and comprising: an annular normally flat body; a pair of arms joined to the body at diametrically opposite locations thereon and extending rearwardly therefrom substantially parallel to the axis of the body; a hook-like finger on the rear of each of said arms, said finger projecting circumferentially in the same direction from one longitudinal edge of their respective arms; and means providing a pair of pads on the body at substantially diametrically opposite localized areas thereof circumferentially intermediate but spaced from said arms, said pads and said fingers having surfaces facing generally toward one another and between which pressure is applied during use of the retainer to place said arms in tension and thereby cause flatwise rearward flexure of those arcuate portions of the body which extend circumferentially between the pads and have the arms joined thereto, and whereby the fingers are biased toward one another.

13. The retainer set forth in claim 12 wherein said fingers are curved substantially concentrically to the axis of the retainer body; and further characterized by the provision of a barb on one of said fingers struck radially inwardly from a portion of the finger remote from the retainer body, with the free edge of the barb facing in the direction of the arm from which said finger projects.

References Cited in the file of this patent
UNITED STATES PATENTS

| | | |
|---|---|---|
| 2,040,258 | Jacobi | May 12, 1936 |
| 2,208,003 | Jacobi | July 16, 1940 |
| 2,306,022 | Lach | Dec. 22, 1942 |
| 2,573,061 | Raymond | Oct. 30, 1951 |